United States Patent Office 3,407,248
Patented Oct. 22, 1968

3,407,248
ALPHA-HYDROXY-BETA-FLUORO-BETA, BETA DICHLORO - ETHYL PHOSPHONIC ACID, O,O-DIESTER
Erich Klauke, Cologne-Flittard, Engelbert Kühle, Bergisch-Gladbach, Ingeborg Hammann, Cologne, and Walter Lorenz, Wuppertal-Vohwinkel, Germany, assignors to Farbenfabriken Bayer Aktiengesellschaft, Leverkusen, Germany, a corporation of Germany
No Drawing. Filed May 28, 1965, Ser. No. 459,909
Claims priority, application Germany, June 12, 1964,
F 43,158
9 Claims. (Cl. 260—953)

The present invention relates to particular phosphonic acid O,O-dialkyl esters having valuable pesticidal properties and to compositions containing the same, as well as the production and use thereof.

It is an object of the present invention to provide particular phosphonic acid O,O-dialkyl esters which possess valuable pesticidal properties.

It is another object of the present invention to provide such phosphonic acid O,O-dialkyl esters which possess especially effective insecticidal properties, rendering the same useful as pest control agents, especially in plant protection.

It is still another object of the present invention to provide esters of the foregoing type which are compatible with plants, whether used alone or in admixture with a carrier vehicle.

It is a still further object of the present invention to provide a process for the production of such phosphonic acid O,O-dialkyl esters which is versatile and which provides good yields of the desired product.

It is a still further object of the present invention to effect the production of such esters at room temperature or at temperatures slightly thereabove in the presence preferably of inert organic solvents.

It is a still further object of the present invention to provide compositions containing esters of the foregoing type in admixture with a carrier vehicle, such as a dispersible liquid or a dispersible solid, for use in plant protection procedures.

It is still another object of the present invention to provide methods of use of such phosphonic acid O,O-dialkyl esters, especially in connection with the combating of pests.

It is still another object of the present invention to provide methods of combating pests which contemplate applying to such pests, including in particular insects, and especially those found in plant crops, pesticidally effective amounts of the esters in question.

It is still another object of the present invention to provide for the protection of agricultural crops, such as tomato, cabbage, and cotton plants, by applying to such plants and the surrounding soil phosphonic acid O,O-dialkyl esters of the instant type so as to destroy all harmful attendant insects.

Other and further objects of the present invention will become apparent from a study of the within specification and accompanying examples.

It has been found in accordance with the present invention that compounds of the general formula

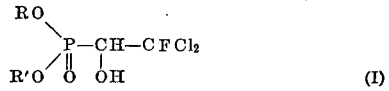

wherein R and R', which may be the same or different, are alkyl radicals, preferably containing 1 to 4 carbon atoms, and optionally halogen-substituted, possess valuable pesticidal properties.

Furthermore, it has been found in accordance with the present invention that compounds of the above-noted general formula are obtained smoothly and in very good yields when monofluorodichloroacetaldehyde is reacted with O,O-dialkyl phosphites of the general formula

in which R and R' are the same as defined above.

The versatile reaction in accordance with the present invention may be illustrated by the following equation:

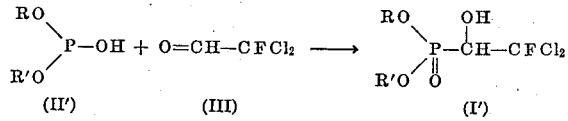

wherein R and R' have the same definitions as noted above.

Typical examples of O,O-dialkyl phosphites which may be reacted in accordance with the present invention, for example, include O,O-dimethyl, O,O-diethyl, O-methyl-O-isopropyl, O-methyl-O-butyl, and O-methyl-O-($\beta$-chloroethyl) phosphites, and the like.

The monofluorodichloroacetaldehyde (B.P. 56–57° C.) also required as starting material for the process according to the present invention, is know from the literature. Such compound, shown by Formula III above, can be obtained in known manner by the reduction of monofluorodichloroacetic acid, for example, by means of lithium aluminum hydride, as the artisan will appreciate.

The reaction according to the present invention is carried out expediently in the presence of an inert organic solvent, such as benzene, chlorobenzene or dioxan; the monofluorodichloroacetaldehyde and the particular O,O-dialkyl phosphite being used in equimolar amounts and the reaction temperature preferably being substantially between about 20–50° C. After evaporation of the solvent, the so-prepared reaction product usually remains in the form of a non-distillable, colorless oil.

Among the inert organic solvents which may be used for carrying out the instant reaction are aromatic hydrocarbons, such as unsubstituted and halo-substituted mononuclear aryl hydrocarbons, and especially those having 6 ring carbon atoms, such as benzene, toluene, xylene, mono- and di-chloro benzenes, and the like, and cycloaliphatic ethers, and especially $C_5$–$C_6$ cyclic ethers, such as dioxan, furan, tetrahydrofuran, and the like.

The compounds which are obtained by the process according to the present invention are characterized advantageously by outstanding pesticidal, especially insecticidal, properties. Such compounds possess about the same effectiveness as the known $\alpha$-hydroxy-$\beta,\beta,\beta$-trichloroethylphosphonic acid O,O-dialkyl esters described in U.S. Patent No. 2,485,578 and in the published documents of German patent application No. F 9,944. The instant compounds, however, are surprisingly very well tolerated by plants.

These significant properties of the compounds according to the present invention may be seen from the following experimental results which are set forth, of course, only by way of illustration and not limitation.

Example 1

To produce a preparation of an active compound, 1 part by weight of the active compound is mixed with 3 parts by weight acetone and 1 part by weight of emulsifier on the base of an alkylarylpolyglycol ether and the concentrate is diluted with water to the concentration given in Table 1 below.

Tomato, cabbage and cotton plants are sprayed until dripping wet with the preparation so prepared. The treated plants then remain under the climatic conditions set forth in Table 1. After 8 days, evaluation of the tests is carried out by determining the degree of damage. For assessing the degree of damage, 0 represents an entirely healthy plant and 5 represents 100% plant damage, while intermediate values represent corresponding intermediate results.

The following specific results were obtained:

TABLE 1

| Active compound (constitution) | Active compound concentration in percent | Temperature 28° C., relative atmospheric humidity 75%: Degree of damage to— | | | Temperature 28° C., relative atmospheric humidity 85%: Degree of damage to cotton |
|---|---|---|---|---|---|
| | | Tomatoes | Cabbage | Cotton | |
| $(CH_3O)_2P-CH-CFCl_2$[1]<br>$\parallel \ \ \ \ \ \ \ \ \ \ \ \ \ \ \mid$<br>$O \ \ \ \ \ \ \ \ \ \ \ \ OH$ | 0.5 | 0.75 | 1.25 | 0.5 | 0.5 |
| $(CH_3O)_2P-CH-CCl_3$[2]<br>$\parallel \ \ \ \ \ \ \ \ \ \ \ \ \ \ \mid$<br>$O \ \ \ \ \ \ \ \ \ \ \ \ OH$ | 0.5 | 1.5 | 3.25 | 2.0 | 3.0 |

[1] According to the present invention.
[2] Known.

As may be seen from Table 1, the instant active compound surprisingly possesses much greater compatibility with plants than the analogous known compound, differing from the instant compound by a terminal trichloromethyl group as opposed to a terminal monofluoro-dichloromethyl group. Thus, with respect to tomatoes, cabbage and cotton at 75% relative atmospheric humidity, the compound α-hydroxy-β-fluoro-β,β-dichloroethyl-phosphonic acid O,O-dimethyl ester, typically representative of compounds covered by the present invention, possesses such an effectiveness that very little damage is done to healthy plants treated with such compound. In contrast thereto, much greater damage occurs with the use of the known compound α - hydroxy - β,β,β - trichloroethyl-phosphonic acid O,O-dimethyl ester. Specifically, a 50% decrease in damage occurs in the tomatoes treated, which may be fractionally stated as ½ of the previous damage experienced. As to the cabbage treated, a 62% decrease in damage is experienced using the compound of the present invention as opposed to the known compound. As to the cotton treated, a 75% decrease in damage is experienced, using the compound of the present invention as opposed to the known compound, whereby to demonstrate that only ¼ of the damage with the known compound occurs when using the instant compound. Regarding 85% relative atmospheric humidity, the damage to cotton treated with the instant compound is ⅙ that where the known compound is used, which amounts to an 83% decrease in damage. Such high decreases in damage to plants treated with a compound of the instant type as opposed to the analogous known compound prove the singular wide plant or crop compatibility and tolerance coupled with good effectiveness of compounds coming within the scope of the present invention as opposed to known compounds. That the instant compounds would possess such outstanding compatibility and tolerance for plants at comparative levels of pesticidal effectiveness as opposed to the closely analogous known compound is completely surprising.

Due to their outstanding insecticidal action and excellent plant compatibility, the compounds according to the present invention are extremely useful as pest control agents, especially in plant protection, preferably in admixture with a solid liquid diluent or carrier.

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powders, dusting agents, granulates, etc. These are prepared in known manner, for instance by extending the active agents with solvents and/or dispersible solid carriers optionally with the use of emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles or assistants for this purpose: solvents, such as aromatic hydrocarbons (for instance, benzene, toluene, xylene, etc.), halogenated, especially chlorinated, aromatic hydrocarbons (for instance, chlorobenzenes), paraffins, (for instance, petroleum fractions), chlorinated aliphatic hydrocarbons (for instance, methylene chloride, etc.), alcohols (for instance, methanol, ethanol, propanol, butanol, etc.), ethers, ether-alcohols (for instance, glycol monomethyl ether, etc.), amines (for instance, ethanolamine, etc.), amides (for instance, dimethyl formamide, etc.), ketones (for instance, acetone, etc.), and water; dispersible finely divided solid carriers, such as natural ground minerals (for instance, kaolins, alumina, silica, chalk, i.e., calcium carbonate, talc, kieselguhr, etc.), and synthetic ground minerals (for instance, highly dispersed silicic acid, silicates, e.g., alkali silicates, etc.); emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, if desired.

In general, the compositions or formulations contain substantially between about 0.1 and 95 percent by weight of the active compound, and preferably substantially between about 0.5 and 90 percent by weight.

The substances according to the invention may be employed by themselves as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes, and granulates, which are thus ready for use.

The following production example is given for the purpose of illustrating, while not limiting, the present invention.

Example 2

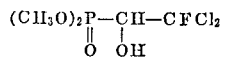

A solution of 13 g. monofluorodichloroacetaldehyde in 100 ml. benzene is mixed at 22° C. with 11 g. O,O-dimethyl phosphite. During the addition, the temperature of the mixture rises slightly. The reaction mixture is subsequently heated to boiling temperature for a short period of time and then evaporated under reduced pressure (100–10 mm. Hg). There remain 22 g. of α-hydroxy-β-fluoro - β,β - dichloroethyl - phosphonic acid O,O - dimethyl ester in the form of a colorless oil.

*Analysis.*—Calculated: C, 19.9%; H, 3.32%; P, 13.75%. Found: C, 19.91%; H, 3.58%; P, 12.90%.

The outstanding insecticidal effectiveness of such compound may be seen from the test results set out in the following table:

TABLE 2

| Use against (test insect) | Active compound concentration in percent | Pests killed in percent |
|---|---|---|
| Caterpillars (*Plutella maculipennis*) | 0.004 | 100 |
| Flies (*Drosophila melanogaster* and *Ceratitis capitata*) | 0.0008 | 100 |
| Aphids (*Rhopalosiphum padi*) | 0.1 | 100 |

Systemic action after application

Example 3

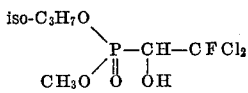

6.5 g. monofluoro - dichloro - acetaldehyde are added dropwise to a solution of 7 g. O - methyl - O - isopropyl phosphite in 50 ml. benzene. Subsequently the solution is heated to boiling temperature for a short time and then evaporated under reduced pressure. There remain 11 g. α - hydroxy - β - fluoro - β,β - dichloro - ethyl - phosphonic acid O - methyl - O - isopropyl ester.

Example 4

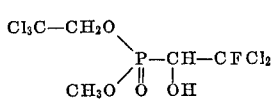

11.3 g. O - methyl - O - (β,β,β - trichloroethyl-) phosphite and 6.5 g. monofluoro - dichloro - acetaldehyde are heated in 50 ml. benzene to boiling temperature for a short time. After evaporation of the reaction mixture there are obtained 15 g. α - hydroxy - β - fluoro - β,β - dichloroethyl - phosphonic acid O - methyl - O - (β',β',β'- trichloroethyl) ester in the form of a colourless oil.

The outstanding insecticidal activity of the compounds obtainable according to Examples 3 and 6 is to be seen from the following test results:

Example 5.—Plutella test

Solvent: 3 parts by weight of dimethylformamide.
Emulsifier: 1 part by weight of alkylarylpolyglycol ether.

To produce a suitable preparation of active compound, 1 part by weight of the active compound is mixed with the stated amount of solvent containing the stated amount of emulsifier and the concentrate is diluted with water to the desired concentration. Cabbage leaves (*Brassica oleracea*) are sprayed with the preparation of the active compound until dew moist and are then infested with caterpillars of the diamond-black moth (*Plutella maculipennis*).

After specified periods of time, the degree of destruction is determined as a percentage: 100% means that all the caterpillars are killed whereas 0% means that none are killed.

The active compounds, their concentrations, the evaluation times and the results obtained can be seen from the following Table 3.

TABLE 3
[Phytopathogenic insects]

| Compound | Active ingredient in percent | Killing rate in percent after 4 days |
|---|---|---|
| $CCl_3-CH_2-O$, $CH_3O$ $\backslash P(=O)-CH(OH)-CFCl_2$ | 0.1 / 0.01 | 100 / 100 |
| iso-$C_3H_7O$, $CH_3O$ $\backslash P(=O)-CH(OH)-CFCl_2$ | 0.1 / 0.01 | 100 / 100 |

Example 6.—Drosophila test

Solvent: 3 parts by weight of dimethylformamide.
Emulsifier: 1 part by weight of alkylarylpolyglycol ether.

To produce a suitable preparation of active compound, 1 part by weight of the active compound is mixed with a stated amount of solvent containing the stated amount of emulsifier and the concentrate is diluted with water to the desired concentration.

1 cc. of the preparation of the active compound is applied with a pipette to a filter-paper disc of 7 cm. diameter. The wet disc is placed in a glass vessel containing 50 banana fruit flies (*Drosophila melanogaster*) and covered with a glass plate. After the specified periods of time, the destruction is determined as a percentage: 100% means that all the flies are killed whereas 0% means that none are killed.

The active compounds, their concentrations, the evaluation times and the degree of destruction can be seen from the following Table 4:

TABLE 4
[Phytopathogenic insects]

| Compound | Active ingredient in percent | Killing rate in percent after 24 hours |
|---|---|---|
| iso-$C_3H_7O$, $CH_3O$ $\backslash P(=O)-CH(OH)-CFCl_2$ | 0.1 / 0.01 | 100 / 100 |
| $CCl_3-CH_2-O$, $CH_3O$ $\backslash P(=O)-CH(OH)-CFCl_2$ | 0.1 / 0.01 / 0.001 | 100 / 100 / 90 |

The procedure of Example 2 is repeated, using respectively: O,O-diethyl phosphite and O-methyl-O-n-butyl phosphite, and the corresponding α-hydroxy-β-fluoro-β, β-dichloroethylphosphonic acid O,O-dialkyl ester is formed, i.e. O,O-diethyl ester and O-methyl-O-n-butyl ester as the case may be.

Each of these esters possesses outstanding insecticidal effectiveness against a variety of pests, and especially caterpillars, flies, aphids, and the like, yet such compounds possess excellent plant compatibility whereby plants treated therewith are not significantly damaged, if at all. Such plants contemplate, of course, the usual agricultural crops, such as tomatoes, cabbage, cotton, and the like.

Accordingly, the present invention contemplates a versatile process for the production of O,O-dialkyl esters of phosphonic acids having the general Formula I noted hereinabove, in which R and R' each respectively is selected from the group consisting of alkyl and halo-alkyl radicals, which comprises reacting an O,O-dialkyl phosphite having the Formula II noted above, in which R and R' each respectively has the foregoing meaning, with monofluorodichloroacetaldehyde, whereby the corresponding O,O-dialkyl ester of phosphonic acid is formed in particularly high yields. Such reaction may be carried out in the presence of an inert organic solvent as aforesaid, such as a member selected from the group consisting of aromatic hydrocarbons, halogenated aromatic hydrocarbons, cyclo aliphatic ethers, and mixtures thereof, the reaction being carried out at a temperature substantially between about 20–50° C.

Thus, O,O-dialkyl esters of phosphonic acid are contemplated herein as valuable pesticidal compounds which have the general formula $$\begin{array}{c} C_1\text{--}C_4\,\text{alkyl-O} \\ C_1\text{--}C_4\,\text{alkyl-O} \end{array}\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\!\! \overset{O}{\underset{}{\overset{\|}{P}}}\text{--}\overset{OH}{\underset{}{\overset{|}{C}H}}\text{--}CFCl_2$$

or have the general formula $$\begin{array}{c} \text{halo-}C_1\text{--}C_4\,\text{alkyl-O} \\ \text{halo-}C_1\text{--}C_4\,\text{alkyl-O} \end{array}\!\!\!\!\!\! \overset{O}{\underset{}{\overset{\|}{P}}}\text{--}\overset{OH}{\underset{}{\overset{|}{C}H}}\text{--}CFCl_2$$

or have the general formula $$\begin{array}{c} \text{halo-}C_1\text{--}C_4\,\text{alkyl-O} \\ C_1\text{--}C_4\,\text{alkyl-O} \end{array}\!\!\!\!\!\! \overset{O}{\underset{}{\overset{\|}{P}}}\text{--}\overset{OH}{\underset{}{\overset{|}{C}H}}\text{--}CFCl_2$$

Typical compounds coming within the purview of the present invention include α-hydroxy-β-fluoro-β,β-dichloroethyl-phosphonic acid O,O-dimethyl ester; α-hydroxy-β-fluoro-β,β-dichloroethyl-phosphonic acid O,O-diethyl ester; α-hydroxy-β-fluoro-β,β-dichloroethylphosphonic acid O-methyl-O-isopropyl ester; α-hydroxy-β-fluoro-β,β-dichloroethyl-phosphonic acid O-methyl-O-butyl ester; α-hydroxy-β-fluoro-β,β-dichloroethyl-phosphonic acid O-methyl-O-(β-chloroethyl) ester, and the like.

The foregoing compounds advantageously lend themselves to use in pesticidal compositions in admixture with a dispersible carrier vehicle of the foregoing type, with the O,O-dialkyl ester of phosphonic acid being present in a pesticidally effective amount, and in an amount which may be generally 0.1–95% by weight of the mixture with the carrier vehicle.

Furthermore, a method of combating pests is particularly contemplated herein, which comprises applying to such pests and their habitat a pesticidally effective amount of O,O-dialkyl ester of phosphonic acid of the type defined hereinabove either alone or in admixture with a dispersible carrier vehicle.

Generally, with regard to the foregoing formulae, R and R′ each respectively contemplates an alkyl radical, especially a lower alkyl radical, and particularly $C_1$–$C_4$ alkyl, such as methyl, ethyl, n-propyl, isopropyl, n-butyl, isobutyl, sec.-butyl, tert.-butyl, and the like; as well as a halo alkyl radical, especially a halo lower alkyl and particularly halo-$C_1$–$C_4$ alkyl, including mono-, di-, tri-, and poly- chloro, -bromo, -iodo, and -fluoro substituted alkyl, as well as mixed mono-, di-, tri-, and poly- chloro, -bromo, -iodo, and -fluoro substituted alkyl, such as the corresponding mono-, di-, tri-, and poly- chloromethyl, -chloroethyl, -chloro-n-propyl, -chloro-isopropyl, -chloro-n-butyl, -chloro-isobutyl, -chloro-sec.-butyl, -chloro-tert.-butyl, the corresponding mono-, di-, tri-, and polybromomethyl, bromo-ethyl, -n-propyl, -isopropyl, -n-butyl, -isobutyl, -sec.-butyl, -tert.-butyl, the corresponding mono-, di-, tri-, and poly- iodo-methyl, -ethyl, -n-propyl, -isopropyl, -n-butyl, -isobutyl, -sec.-butyl, -tert.-butyl, the corresponding mono-, di-, tri-, and poly- fluoro-methyl, -ethyl, -n-propyl, -isopropyl, -n-butyl, -isobutyl, -sec.-butyl, -tert.-butyl, dichloro-monobromo-methyl, chloro-bromo-n-propyl, dibromo-dichloro-isobutyl, and the like.

In particular, the α-hydrxy-β-fluoro-β,β-dichloroethyl-phosphonic acid-O,O-dialkyl esters include the symmetrical dimethyl and diethyl esters as well as the asymmetrical methyl-isopropyl, and methyl-butyl esters as well as the asymmetric methyl-β-chloroethyl-ester.

As used herein, i.e., both in the specification and claims, the term "dialkyl ester(s)" of phosphonic acid contemplates both symmetrical and asymmetrical alkyl hydrocarbon groups, as well as halo-alkyl groups, and mixed alkyl hydrocarbon and halo-alkyl groups.

It will be appreciated that the instant specification and examples are set forth by way of illustration, and not limitation, and that various modifications and changes may be made without departing from the spirit and scope of the present invention which is to be limited only by the scope of the appended claims.

What is claimed is:

1. O,O-dialkyl esters of phosphonic acid having the general formula $$\begin{array}{c} RO \\ R'O \end{array}\!\!\!\!\!\! \overset{O}{\underset{}{\overset{\|}{P}}}\text{--}\overset{OH}{\underset{}{\overset{|}{C}H}}\text{--}CFCl_2$$

in which R and R′ each respectively is selected from the group consisting of alkyl and haloalkyl radicals.

2. O,O-dialkyl esters of phosphonic acid having the general formula $$\begin{array}{c} C_1\text{--}C_4\,\text{alkyl-O} \\ C_1\text{--}C_4\,\text{alkyl-O} \end{array}\!\!\!\!\!\! \overset{O}{\underset{}{\overset{\|}{P}}}\text{--}\overset{OH}{\underset{}{\overset{|}{C}H}}\text{--}CFCl_2$$

3. O,O-dialklyl esters of phosphonic acid having the general formula $$\begin{array}{c} \text{halo-}C_1\text{--}C_4\,\text{alkyl-O} \\ \text{halo-}C_1\text{--}C_4\,\text{alkyl-O} \end{array}\!\!\!\!\!\! \overset{O}{\underset{}{\overset{\|}{P}}}\text{--}\overset{OH}{\underset{}{\overset{|}{C}H}}\text{--}CFCl_2$$

4. O,O-dialkyl esters of phosphonic acid having the general formula $$\begin{array}{c} \text{halo-}C_1\text{--}C_4\,\text{alkyl-O} \\ C_1\text{--}C_4\,\text{alkyl-O} \end{array}\!\!\!\!\!\! \overset{O}{\underset{}{\overset{\|}{P}}}\text{--}\overset{OH}{\underset{}{\overset{|}{C}H}}\text{--}CFCl_2$$

5. α-Hydroxy-β-fluoro-β,β-dichloroethyl-phosphonic acid O,O-dimethyl ester.

6. α-Hydroxy-β-fluoro-β,β-dichloroethyl-phosphonic acid O,O-diethyl ester.

7. α-Hydroxy-β-fluoro-β,β-dichloroethyl-phosphonic acid O-methyl-O-isopropyl ester.

8. α-Hydroxy-β-fluoro-β,β-dichloroethyl-phosphonic acid O-methyl-O-butyl ester.

9. α-Hydroxy-β-fluoro-β,β-dichloroethyl-phosphonic acid O-methyl-O-(β-chloroethyl) ester.

References Cited

UNITED STATES PATENTS

| | | | |
|---|---|---|---|
| 2,579,810 | 12/1951 | Fields | 260—953 |
| 2,701,225 | 2/1955 | Lorenz | 260—953 |
| 2,818,366 | 12/1957 | Birum | 167—22 |
| 2,906,661 | 9/1959 | Baker | 167—22 |
| 3,053,876 | 9/1962 | Malz | 260—461 |
| 3,059,017 | 10/1962 | Dever | 260—461 |

CHARLES B. PARKER, *Primary Examiner.*

A. H. SUTTO, *Assistant Examiner.*